Patented Feb. 6, 1940

2,189,726

UNITED STATES PATENT OFFICE 2,189,726

METHOD OF PURIFYING BENZOIC ACID

Courtney Conover, St. Louis, Mo., assignor, by mesne assignments, to Monsanto Chemical Company, a corporation of Delaware No Drawing. Application June 16, 1930, Serial No. 461,659

6 Claims. (Cl. 260—525)

This invention relates to the purification of benzoic acid containing acid impurities and it has particular application to the separation of small amounts of phthalic and maleic acids from a crude benzoic acid product.

Benzoic acid made from phthalic acid invariably contains a small amount of phthalic acid and may contain some maleic acid. (The term "phthalic acid" as used herein is to be understood as contemplating either phthalic acid or the anhydride or a mixture of both.) Although the amount of phthalic acid impurities present in such crude benzoic acid product may be small and indeed insufficient to have any harmful effect, the demands of the trade are such as to require a product containing only minute amounts of these impurities.

Heretofore it has been suggested that phthalic acid be separated from benzoic acid by precipitating the former from a gaseous mixture. It has also been suggested that benzoic acid be purified by treating the crude solid material with a solution of bisulphite. While these processes improve a product containing large amounts of impurities they are inadequate for the purpose of separating amounts of impurities, particularly phthalic acid, which do not exceed 1% of the total.

One object of this invention is to provide a method of purifying crude benzoic acid containing acid impurities whereby a product is obtainable which for practical purposes is absolutely pure.

This invention likewise contemplates a commercially feasible and readily adoptable process for removing phthalic acid impurities from a benzoic acid product whereby the amount of such phathalic acid impurity may be reduced to negligible proportions.

Benzoic acid is manufactured commercially by various methods. Among these, the processes utilizing phthalic acid or its salts as a raw material are attractive but suffers the disadvantage of offering a difficult problem in the refining of the crude product. Moreover inasmuch as benzoic acid produced by other than the phthalic acid process contains no phthalic acid the presence thereof is prejudicial from a marketing standpoint even though its presence is not harmful.

I have found that the quality of benzoic acid made from phthalic acid may be improved very materially, to obtain products of almost any degree of purity if one subjects fluid benzoic acid to the selective purifying action of an aqueous medium. One convenient way of effecting this object is to steam distill benzoic acid and subsequently condense the vapors whereby distinct layers of benzoic acid and water are formed which may be separated conveniently by decantation. The aqueous layer is thereby brought into equilibrium with the liquid and will be found to contain both phthalic and benzoic acids. However, the ratio of phthalic acid to benzoic acid which is dissolved is substantially greater than that of the product remaining undissolved. Thus, a crude product containing 1% phthalic acid may be refined by one such treatment to produce a product containing less than .05% phthalic acid. It is to be noted that the resulting product may be subjected to a second purification treatment in which case the amount of phthalic acid may be reduced to a smaller amount. In this way I have been able to prepare benzoic acid containing less than .001% phthalic acid.

In lieu of the steam distillation one may heat the crude benzoic acid to render it molten and subsequently agitate it with a quantity of pure water or water saturated with benzoic acid whereby the selective dissolution of phthalic acid is effected. The degree of equilibrium attained between the aqueous phase and the molten benzoic acid phase is, of course, a function of the extent of agitation. Although benzoic acid melts well above the boiling point of water at atmospheric pressure, when benzoic acid is heated in the presence of an excess of water it melts below the boiling point, the precise melting point thereof being dependent upon its purity. For example, a mixture of water and benzoic acid containing substantial amounts of phthalic acid melts below 90°. As the purity of benzoic acid increases the melting point rises, but in no case exceeds the boiling point of the aqueous mixture.

Whether one distills the crude benzoic and separates the two liquid layers or agitates the molten benzoic acid in the presence of water the principles upon which this invention is founded are the same, namely the selective dissolution of the acid impurities by means of an aqueous medium. Although I prefer to employ the steam distillation process since it enables one to effect simultaneously the separation of non-volatile impurities and affords a continuous, convenient mode of operation, satisfactory results may be obtained without the steam distillation step.

A detailed description of one method of practicing this invention is hereinafter set forth: A quantity of crude benzoic acid is steam distilled from a molten mass maintained at 145°–165° C. The fraction which condenses above 101°–103° C.

is permitted to form into two layers—an aqueous layer and a molten benzoic acid layer. The aqueous layer is returned continuously to the receptacle containing the crude material undergoing steam distillation. One should adjust the condensing temperature to obtain a condensate consisting essentially of equal amounts by weight of water and benzoic acid.

In general, since the volatility of phthalic anhydride increases with the temperature one should maintain as low a temperature as is otherwise practicable, having due regard for the fact that the lower the temperature of the crude product undergoing steam distillation the more steam is required which in turn, when condensed, will result in the dissolution of proportionately greater amounts of benzoic acid products.

It is advantageous to add a small quantity of a basic material such as sodium carbonate to the crude benzoic acid before steam distillation, the amount utilized being in slight excess of the mol equivalent of phthalic acid present in the charge, substantially as described in my copending application Serial Number 438,632, now Patent No. 1,937,383.

By proceeding as described hereinabove, a crude product which contains 6½% of phthalic acid may be refined by a single operation to one containing .8% phthalic acid. The resulting product can be treated a second time to obtain one in which the phthalic acid is reduced to less than .03%. I have repeated these refining operations and have obtained products containing imperceptible amounts of phthalic acid.

While many methods for refining benzoic acid have been suggested heretofore, particularly for the removal of phthalic acid impurities, the present process affords a process which is more easily adapted to commercial practices and does not require the careful control or skilled supervision necessitated by the former processes. Although I have described in detail an embodiment of my invention involving the use of steam distillation, it will be apparent from the description herein that the invention is not so limited but contemplates broadly the use of an aqueous medium for the selective dissolution of phthalic acid from benzoic acid.

What I claim is:

1. In the purification of benzoic acid containing phthalic acid impurities the steps comprising scrubbing the crude molten benzoic acid with a non-basic aqueous liquid medium capable of dissolving phthalic acid and subsequently separating the aqueous medium from the scrubbed benzoic acid.

2. The method of purifying benzoic acid containing water soluble impurities which comprises scrubbing benzoic acid while in a molten state with water and separating the water while in liquid state from the scrubbed benzoic acid.

3. The method of separating small amounts of phthalic acid from benzoic acid which comprises treating the crude benzoic acid while in a liquid condition with water to dissolve the phthalic acid and finally separating the water from the benzoic acid.

4. The method of separating small amounts of phthalic acid from benzoic acid which comprises scrubbing the crude benzoic acid while in a molten state with water whereby phthalic acid is dissolved from the benzoic acid and separating the immiscible layers of benzoic acid and water containing the phthalic acid impurities.

5. The method of separating small amounts of water soluble organic acid impurities from crude benzoic acid which comprises treating such crude benzoic acid while in a molten state with water under conditions whereby a substantial proportion of the impurities are dissolved and allowed to form into an immisicible aqueous layer and separating such aqueous layer from the undissolved molten benzoic acid layer.

6. The process for the production of pure benzoic acid which comprises treating crude benzoic acid obtained from phthalic anhydride with a small amount of water which is sufficient to dissolve any phthalic acid and phthalic anhydride present, thereby hydrating the phthalic anhydride, and separating the solution from the benzoic acid.

COURTNEY CONOVER.